(No Model.)
G. B. HAMLIN.
VEHICLE SPRING.
No. 250,237. Patented Nov. 29, 1881.
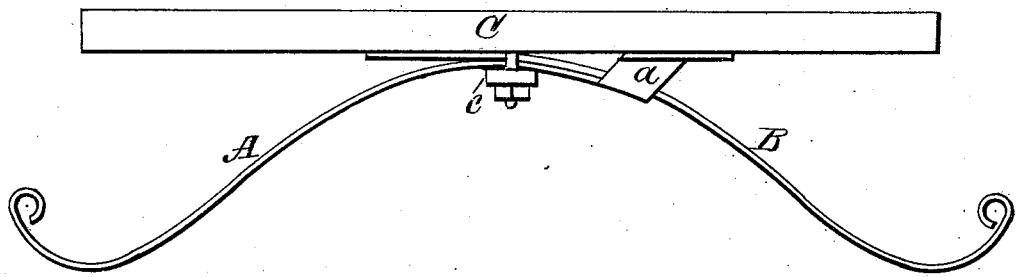
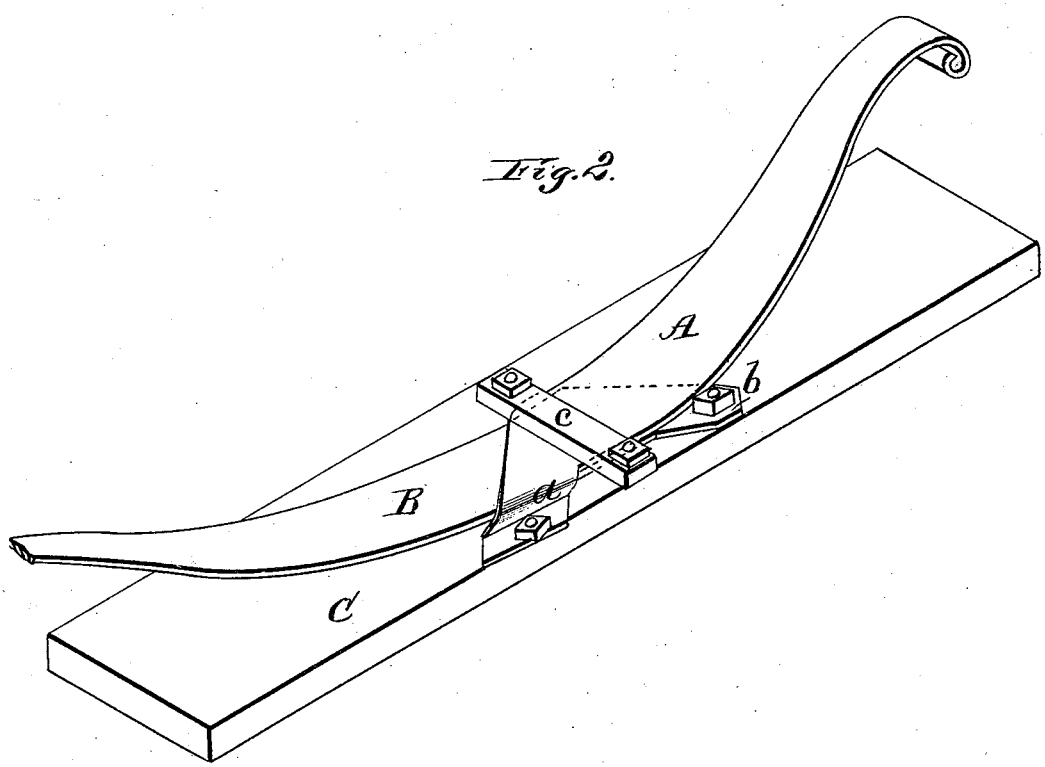
Witnesses:
H. C. McArthur
John C. Kittrif
Inventor:
George B. Hamlin,
per Chas. H. Fowler
Attorney.

UNITED STATES PATENT OFFICE.

GEORGE B. HAMLIN, OF WILLIMANTIC, CONNECTICUT.

VEHICLE-SPRING.

SPECIFICATION forming part of Letters Patent No. 250,237, dated November 29, 1881.

Application filed September 29, 1881. (No model.)

*To all whom it may concern:*

Be it known that I, GEORGE B. HAMLIN, a citizen of the United States, residing at Willimantic, in the county of Windham and State of Connecticut, have invented certain new and useful Improvements in Vehicle-Springs; and I do hereby declare that the following is a full, clear, and exact description of the same, reference being had to the annexed drawings, making a part of this specification, and to the letters and figures of reference marked thereon.

Figure 1 of the drawings is a front elevation of my invention, and Fig. 2 is an underside perspective view of the same.

The present invention has relation to certain new and useful improvements in side-bar springs for vehicles; and it consists in the details of construction, as will be hereinafter described, and subsequently pointed out in the claim.

In the accompanying drawings, A B represent the two sections of the spring, which may be composed of as many leaves as desired, with yokes interposed between the leaves, as shown in my former patent, dated September 2, 1879, No. 219,087. The section A of the spring is formed at its larger or inner end with a lateral confining-plate, *a*, which is bolted to the under side of the cross-piece or body C. The section B of the spring is formed with arm *b*, for securing it with a suitable bolt to the cross-piece or body.

It should be noticed that both the plate *a* and arm *b* project from the side of the sections A B, so that the surface of the springs will come in direct contact where they lap each other without the bolts or screw-nuts interfering with them. After the section B has been secured to the cross-piece or body C by bolt and nut, the section A is placed over it so that the shoulder of the confining-plate *a* will abut against the edge of the section B, after which the plate is secured to the cross-piece or body by bolt and nut. A yoke, *c*, confines the two sections in close contact with each other, thereby forming a solid and firm fastening of the sections, giving increased power and strength to the spring and insuring its springing its entire length.

The spring formed in sections and connected together as described admits of its manufacture at a greatly-reduced cost, and furnishes a spring possessing lightness as well as durability.

Having now fully described my invention, what I claim as new, and desire to secure by Letters Patent, is—

A side-bar spring for vehicles, consisting of the section A, formed with lateral confining-plate *a*, and the section B, with arm *b*, said sections being arranged and connected together as shown and described.

In testimony that I claim the above I have hereunto subscribed my name in the presence of two witnesses.

GEORGE B. HAMLIN.

Witnesses:
JNO. L. HUNTER,
CHS. E. STRONG.